United States Patent [19]

United States Patent [19]
Stanger et al.

[11] Patent Number: 5,979,929
[45] Date of Patent: Nov. 9, 1999

[54] FASTENERLESS SLIP-ON SPRING CLIP FOR AIRBAG MODULE RETENTION

[75] Inventors: Randy M. Stanger, Hooper; Mark M. Hanebut, Ogden, both of Utah

[73] Assignee: Autoliv ASP, Inc., Ogden, Utah

[21] Appl. No.: 08/850,426

[22] Filed: May 2, 1997

[51] Int. Cl.⁶ .................................................. B60R 21/16
[52] U.S. Cl. ...................................... 280/728.2; 280/732
[58] Field of Search ................................ 280/728.2, 732, 280/728.1, 728.3

[56] References Cited

U.S. PATENT DOCUMENTS

| | | | |
|---|---|---|---|
| 5,489,116 | 2/1996 | Boag | 280/728.2 |
| 5,639,111 | 6/1997 | Spencer et al. | 280/728.2 |
| 5,662,350 | 9/1997 | Bathon et al. | 280/728.2 |
| 5,709,402 | 1/1998 | Leonard | 280/728.2 |
| 5,755,458 | 5/1998 | Donovan | 280/728.2 |
| 5,803,487 | 9/1998 | Kikuchi et al. | 280/728.2 |

OTHER PUBLICATIONS

Research Diclosure Statement # 346102, Feb. 1993.

*Primary Examiner*—Christopher P. Ellis
*Attorney, Agent, or Firm*—Sally J. Brown

[57] ABSTRACT

A new and improved fastenerless spring clip is provided for mounting an airbag module assembly in a fixed position behind a breakaway cover formed in the instrument panel of the vehicle. One end of the spring clip includes a slip-on connector which is adapted to slip-engage and self-lock onto a wall surface of the airbag module without requiring special tools or additional fasteners such as rivets. The opposite end of the clip includes a snap-on connector which is adapted to snap-engage and self-lock onto a vehicle mounting bracket that is eventually secured to the vehicle behind the instrument panel.

15 Claims, 3 Drawing Sheets

FASTENERLESS SLIP-ON SPRING CLIP FOR AIRBAG MODULE RETENTION

FIELD OF THE INVENTION

This invention relates to the field of motor vehicle airbag restraint systems used for protecting vehicle occupants in the event of a collision. More particularly, this invention relates to spring clips adapted to be fastened to a module housing during assembly of a passenger side airbag module and used later for retention of the module behind the instrument panel of a motor vehicle.

BACKGROUND OF THE INVENTION

Passenger side airbag modules are normally mounted behind the instrument panel of a motor vehicle. The airbag module comprises a reaction canister which houses a cylindrical inflator and a folded airbag. It may also include a dust cover to protect the airbag and module components prior to installation in the vehicle. A breakaway portion of the instrument panel forms the cover of the airbag module. In the event of a vehicle collision, a remote collision sensor sends an electric signal to activate the inflator which rapidly generates a quantity of gas to inflate the airbag. Upon inflation, the airbag rapidly expands outward through the mouth of the reaction canister, breaking away the module cover portion of the instrument panel and deploying into the vehicle passenger compartment to cushion the vehicle passenger from injury-causing impact with interior structures.

During module assembly, it is customary to mount a pair of spring clips to the bottom wall of the reaction canister. The spring clips serve to secure the module in place behind the instrument panel during module installation and airbag deployment. However, the current practice requires the use of rivets to permanently fasten each clip to the reaction canister which has led to numerous problems. For instance, riveting of the spring clips to the module requires separate rivet assembly stations, which add to the module manufacturing costs. Rivet stations also slow down the module assembly time, reducing throughput on the production line. In addition, rivets are a major cause of reworking the module assembly due to the necessity of replacing broken or unfastened rivets. The elimination of rivets altogether from the manufacture of airbag modules would result in cost savings in module manufacturing and would lead to quicker module production.

What is needed is a quick, simple and reliable means for attaching module retention spring clips to a passenger side airbag module during module assembly without requiring the use of special tools or additional fasteners such as rivets.

SUMMARY OF THE INVENTION

It is, therefore, an object of this invention to provide a fastenerless spring clip that can be quickly and reliably attached to a module reaction canister during assembly of a passenger side airbag module, without the need for special tools or additional fasteners, and reliably used later for permanently mounting the module behind the instrument panel of a motor vehicle.

It is another object of this invention to eliminate altogether the need for rivets for fastening module retention spring clips to a module reaction canister.

This invention further provides a fastenerless, slip-on and self-locking spring clip used for module retention in a vehicle, which is possessed of a minimum number of parts, is economical in manufacture, quick and easy to assemble, and durable and reliable in operation.

Still another object of this invention is to provide a simpler, more economical in manufacture, easier to assemble, airbag module assembly, wherein the module retention spring clips to module connection is made without the use of special tools or rivets.

Briefly, and in accordance with the foregoing, this invention resides in a fastenerless spring clip which is used for securely retaining an airbag module within a motor vehicle, wherein the spring clip includes an elongated body having a first end connectable to the airbag module and a second end connectable to the motor vehicle. The first end includes a rivetless, slip-on connector, adapted to self-lockingly, slip-engage onto the airbag module, including a channel having an open slot through which a wall of the module is received and one or more staked tabs projecting within the channel for positively clamping the module within the channel, with each staked tab having a free upper edge for lockingly advancing and biting into a surface of the module as it is received within the channel. The second end includes a resilient, snap-on spring connector adapted to self-lockingly, snap-engage onto a vehicle mounting bracket fixedly mounted behind a breakaway cover formed in an instrument panel of the motor vehicle. This invention also resides in an airbag module incorporating one or more of the aforesaid fastenerless spring clips and in an airbag module installation using the same to permanently secure the module in the vehicle.

The aforesaid and other objects, features and advantages of this invention will become more apparent from the following description and the appended claims.

BRIEF DESCRIPTION OF THE DRAWINGS

With this description of the invention, a detailed description follows with reference to the drawings, in which like reference numerals denote like elements, and in which.

It should be understood that there are shown in the aforesaid drawings certain exemplary embodiments of the invention as presently preferred. The invention is not limited to these embodiments and is capable of variation within the spirit and scope of the appended claims.

DETAILED DESCRIPTION OF THE PREFERRED EMBODIMENTS OF THE INVENTION

Figure 1:
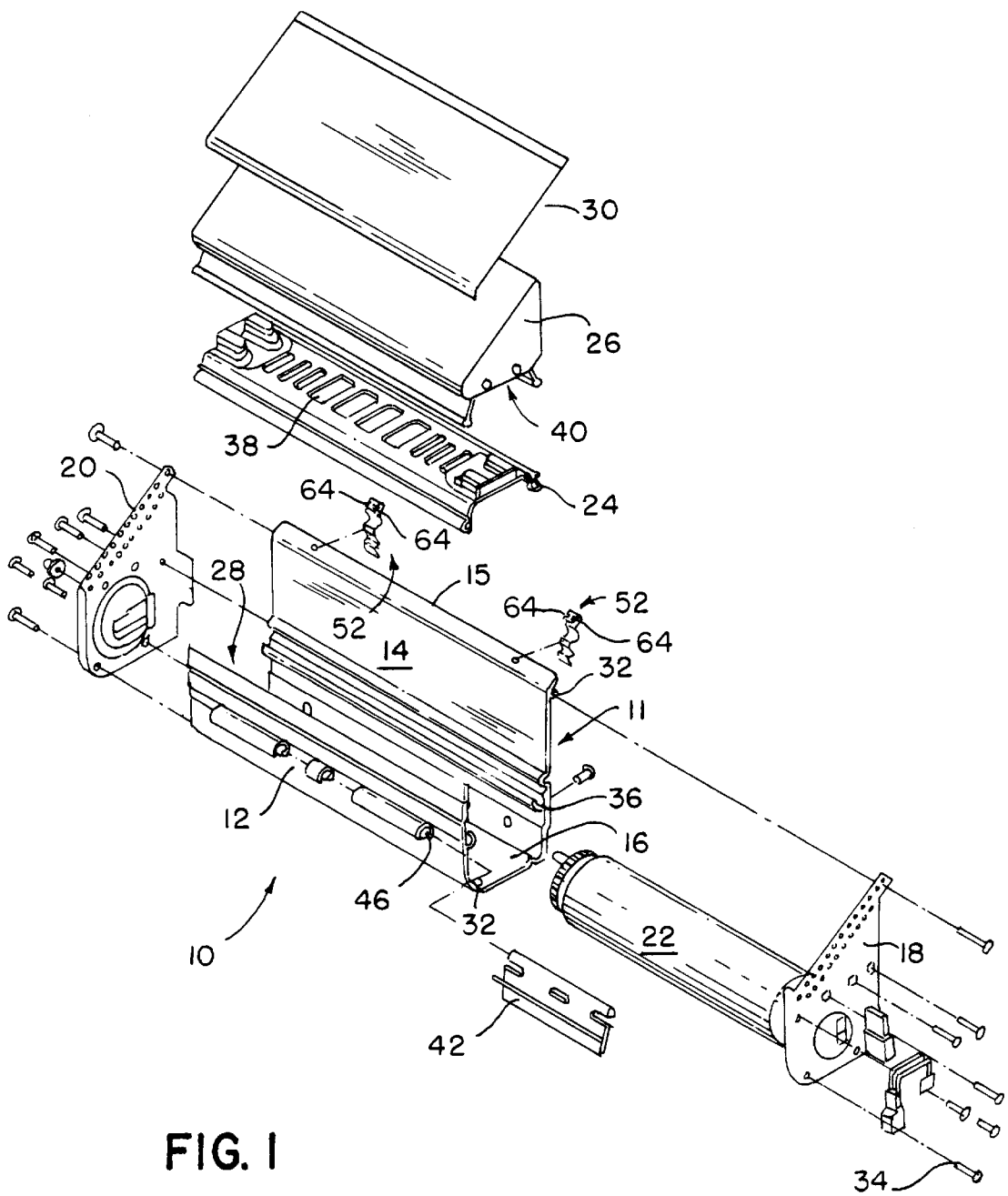
FIG. 1 is an isometric view of a passenger side airbag module assembly in accordance with this invention, showing a pair of fastenerless spring clips being attached to the module housing.

Referring now to the drawings, FIG. 1 shows a passenger side airbag module assembly which is adapted to be mounted behind the instrument panel of a motor vehicle. It comprises a trough-shaped reaction canister 11 having a top wall 12, a bottom wall 14, and a rear wall 16. The reaction canister may be formed, for example, from an aluminum extrusion. The opposite ends of the reaction canister 11 are closed by end plates 18, 20. The closed canister houses, within its trough, an electrically activated cylindrical inflator 22 along with a gas diffuser 24 and an uninflated and folded airbag 26. The front edges of the top and bottom walls 12, 14 and end plates 18, 20 form together an open mouth 28 opposite the rear wall 16 and out through which the airbag 26 deploys as it inflates. The open mouth 28 can be closed by a frangible dust cover 30 to protect the airbag and other module components prior to installation in the vehicle.

The reaction canister 11 can be provided with screw channels 32 as needed for attachment of the end plates 18, 20 by means of screws 34. The reaction canister 11 can also contain diffuser and airbag mouth retaining channels 36 as needed for attachment of the airbag 26 and the diffuser 24 in position over the inflator 22 by means of mounting rods 37 (FIG. 5), so as to permit generated gas to flow out from the fired inflator 22 through gas ports 38 formed in the diffuser 24 and into the open mouth 40 of the folded airbag 26 for inflation and deployment. A tether anchor 42 carrying one end of a fabric tether 44 (FIG. 5) can be connected to the reaction canister by means of channels 46 provided on the top wall 12. The opposite end of the tether 44 can be connected to a breakaway cover 48 (FIG. 5) which forms part of the instrument panel 50 (FIG. 5) of the vehicle and behind which the assembled airbag module 10 is mounted.

The aforesaid description of a passenger side airbag module assembly 10 is well known in the art. Yet, the particularly relevant feature of this invention is the one or more fastenerless, self-locking, slip-on, spring clips which can be quickly and easily fastened to the reaction canister so as to be later used for retention of the finished airbag module 10 in the vehicle. As shown in FIG. 1, a pair of fastenerless, slip-on, spring clips 52 of this invention can be mounted to the free front edge 15 of the bottom wall 14 of the reaction canister. Each spring clip 52 may be formed, for example, from steel stampings. In the past, mounting of spring clips to the reaction canister required driving rivets through matching rivet holes in both the spring clips and the reaction canister. In this invention, each spring clip 52 includes a quick-acting, self-locking, slip-on, rivetless connector thereon which requires no special tools or rivets or other permanent fasteners for attachment in a fixed position onto the reaction canister during assembly of the airbag module.

Figure 2:
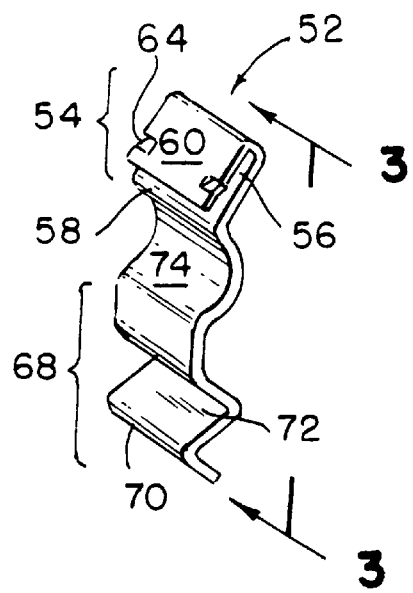
FIG. 2 is an isometric view of a fastenerless spring clip in accordance with this invention.
Figure 3:
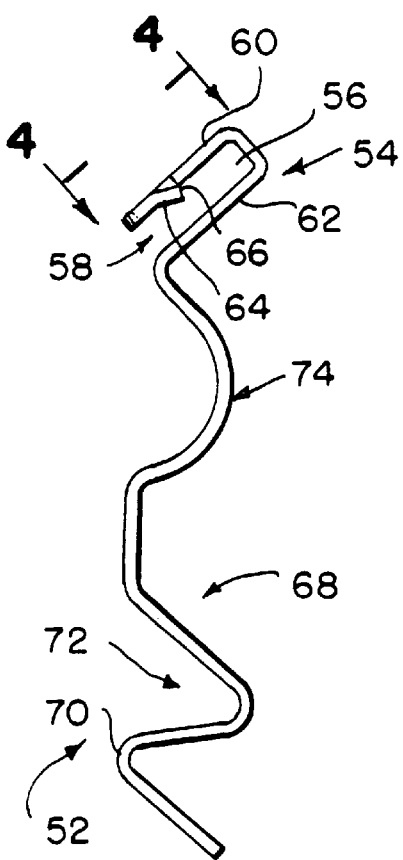
FIG. 3 is an enlarged end view of the spring clip, taken along line 3—3 of FIG.2.
Figure 4:
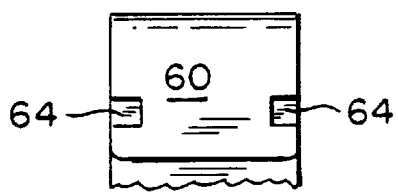
FIG. 4 is an enlarged fragmented top view of the spring clip, taken along line 4—4 of FIG. 3; and, FIG. 5 is an end view, partially cutaway, showing the manner in which the passenger side airbag assembly similar to that of FIG. 1 is mounted behind the instrument panel of a motor vehicle using the fastenerless spring clips of FIGS. 2–4 for module retention in the vehicle.

As best seen in FIGS. 2–4, each fastenerless spring clip 52 includes, at its upper end, a quick-acting, self-locking, slip-on connector portion 54 adapted to be mounted to the reaction canister 11. The slip-on portion 54 comprises a channel 56 having an open slot 58 formed therein which is sized to receive between the channel 56 the free front edge 15 of the bottom wall 14 of the reaction canister 11. The channel 56 can be formed, for example, by folding over a portion of the free upper end of the clip upon itself and having the slot 58 defined between the folded over channel side walls 60, 62 opposite the fold. Included on the opposite outer side edges of the slip-on clip portion 54 are self-locking staked tabs 64, one on each outer side edge. Each staked tab 64 is struck from the upper channel side wall 60 inwardly and upwardly, forming a free upper edge 66 extending within the channel 56. The free upper edge 66 is used for eventually lockingly engaging an inside surface of the bottom wall 14 of the reaction canister, as the free front edge 15 is slip-fit through the slot 58 and entirely within the channel 56. The free upper edge 66 of each staked tab 64 is designed to advance and bite into the engaging surface of the reaction canister wall, creating a positive clamping force to firmly hold the spring clip 52 in place on the reaction canister and resist its withdrawal in the opposite direction. The staked tabs 58, thus, provide a rivetless fastening means for clamping the spring clip 52 to the module. As best seen in FIGS. 3-4, the staked tabs 64 are formed integral with the upper channel wall 60, although it is understood that the tabs can be formed integral with the lower channel wall 62 as well. The integral tabs 64 can be formed, for example, through notching.

The spring clip 52 also includes, at its lower end, a resilient, snap-on connector portion 68 for securely fastening the airbag module in position behind the instrument panel 50 of the vehicle. The snap-on portion 68 comprises a resilient, snap-on, spring tab 70 disposed below a channel 72. The spring tab 70 and channel 72 can be formed, for example, by making two reverse folds on a portion of the lower free end of the clip, with the lower fold forming the spring tab 70 being opposite the fold forming the slip-on connector 54. During the module assembly process, upon slip-mounting the slip-on portion 54 onto the bottom wall 14 of the canister, the snap-on spring tab 70 bears against the underside surface of the bottom wall 14. The spring tab 70, however, is eventually used for lockingly engaging an underside surface of a vehicle mounting bracket between the spring tab 70 and the bottom wall 14, with the mounting bracket being used to permanently retain the airbag module in the vehicle, as will be further explained below. The fastenerless spring clip 52 also contains an intermediate arcuate portion 74 which is sized to nest over one of the screw channels 32 positioned adjacent to the free front edge 15 of the bottom wall 14 of the reaction canister.

Figure 5:
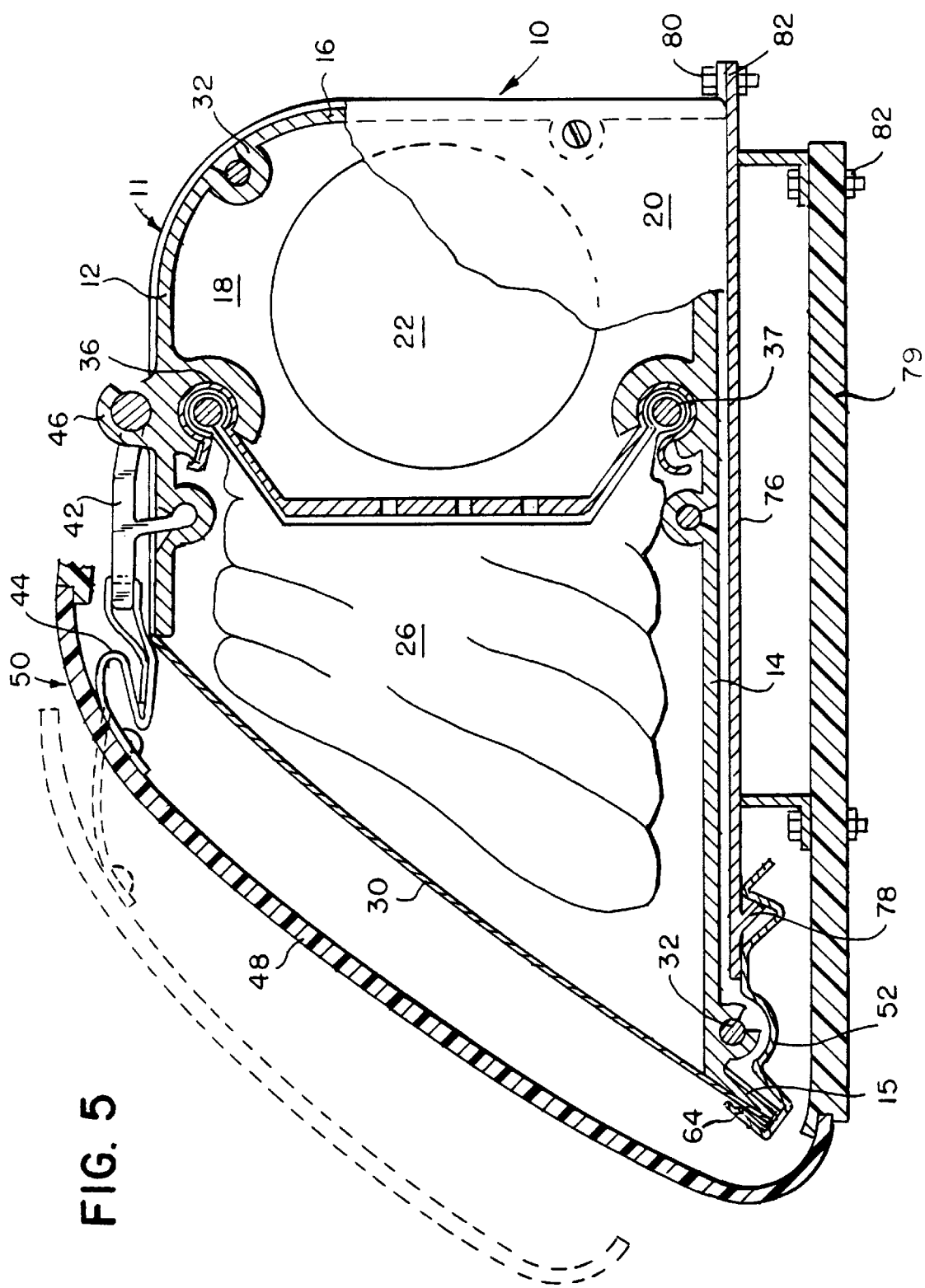

Referring now to FIG. 5, the motor vehicle destined to receive the passenger side airbag module assembly 10 of this invention includes a breakaway cover 48 portion formed in the instrument panel 50 and behind which the airbag module 10 is mounted using one or more of the aforesaid fastenerless spring clips 52. The breakaway cover 48 may be interfit within the instrument panel in any manner well known in the art. At the onset of a collision, an onboard collision sensor (not shown) sends an electrical signal to the inflator 22, which, upon activation, rapidly generates a quantity of gas, causing the airbag 26 to inflate outwardly against the breakaway cover 48. The developing airbag force causes the cover 48 to separate from the instrument panel 50 (as shown in broken lines in FIG. 5) and pivotally swing open out of the path of the expanding airbag, so as to allow the airbag to deploy out from the mounted module into the vehicle passenger compartment.

Before mounting the airbag module in the vehicle, a pair of the aforesaid spring clips 52 are first aligned over the portion of the free front edge 15 of the bottom wall 14 onto which they will be mounted. Once properly aligned, the slip-on connector portion 54 is merely pushed in place with a quick and simple unidirectional thrust towards the rear wall 16 of the reaction canister until the front edge 15 is completely received within channel 56 and the free upper edges 66 of the self-locking, staked tabs 64 bite and advance into the inside surface of the bottom wall 14, thereby lockingly holding the spring clip 52 in place without the use of special tools or rivets. Thereafter, when installing the airbag module 10 in the vehicle in position behind the instrument panel 50 before the breakaway cover 48 is installed, the bottom wall 14 of the reaction canister is slip-fit over the front end of a vehicle mounting bracket 76, causing the spring tab 70 of the snap-on connector portion 68 to bias away from the bottom wall 14. The mounting bracket 76 is received within the space formed between the bottom wall 14 and the biased spring clip 52 until it is locked in place as the spring tab 70 snaps back over a locking tab 78 projecting from the underside of the bracket 76, positively clamping the bracket tab 78 within the channel 72. The opposite end of the mounting bracket 76 is then mounted together to both the rear edge of the bottom wall 14 and the vehicle structure 79 positioned behind the instrument panel with, for example, screws 80 and nuts 82, to securely fasten the airbag module 10 in a fixed position behind the instrument panel 50. The fastenerless spring clip 52, thus, not only fixedly anchors onto the module 10 without needing special tools or rivets, but also positively retains the front end 15 of the module in place during installation in the vehicle and during airbag deployment, so as to allow proper deployment of the airbag 26 into the passenger compartment.

It can thus be seen that with this invention the use of rivetless fastening means to secure the spring clip to the module makes the airbag module assembly process much simpler, easier, quicker, and more economical. It also eliminates the need for rivet stations and costs associated equipment, equipment maintenance and downtime. Moreover, it simplifies the module construction since it now possesses fewer parts.

From the foregoing it will be seen that this invention is one well adapted to attain all ends and objects hereinabove set forth together with the other advantages which are apparent and which are inherent to the structure. Since many possible variations may be made of the invention without departing from the scope thereof, the invention is not intended to be limited to the embodiments disclosed, which are considered to be purely exemplary. Accordingly, reference should be made to the appended claims to assess the true spirit and scope of the invention, in which exclusive rights are claimed.

What is claimed is:

1. A fastenerless spring clip for retention of an airbag module in a motor vehicle, comprising:

an elongated body having a first end connectable to said airbag module and a second end connectable to said motor vehicle, said first end including a slip-on connector adapted for self-locking slip-fit engagement onto said airbag module prior to installation in said motor vehicle wherein said slip-on connector includes a channel having an open slot through which said airbag module is received and one or more staked tabs projecting within said channel for positively clamping said airbag module within said channel.

2. The fastenerless spring clip for retention of an airbag module of claim 1, wherein:

each of said one or more staked tabs has a free upper edge for lockingly advancing into said airbag module as said module is received within said channel.

3. The fastenerless spring clip for retention of an airbag module of claim 2, wherein:

said one or more staked tabs are formed integral with a channel side wall.

4. The fastenerless spring clip for retention of an airbag module of claim 3, wherein:

said one or more staked tabs comprise two tabs, one tab on each opposite outer edge of said channel side wall.

5. The fastenerless spring clip for retention of an airbag module of claim 3, wherein:

said one or more staked tabs are struck from said channel side wall inwardly within said channel and having said free upper edge facing upwardly and away from said open slot.

6. A fastenerless spring clip for retention of an airbag module in a motor vehicle, comprising:

an elongated body having a first end connectable to said airbag module and a second end connectable to said motor vehicle, said first end including a slip-on connector adapted for self-locking slip-fit engagement onto said airbag module prior to installation in said motor vehicle wherein said second end includes a resilient, snap-on spring connector adapted to fixedly snap-fit onto a vehicle mounting bracket fixedly mounted behind a breakaway cover formed in an instrument panel of said motor vehicle.

7. An airbag module, incorporating a fastenerless spring clip, comprising:

a substantially trough-shaped reaction canister having a top wall, a bottom wall, a rear wall, first and second end plates, and open front mouth opposite said rear wall defining a trough for containing an inflator and a folded airbag therein; and, one or more fastenerless spring clips attached to said reaction canisters, each spring clip having a first end secured to said reaction canister and a second end connectable behind a breakaway cover formed in an instrument panel of a motor vehicle, wherein said first end includes a self-locking, slip-on connector wherein said slip-on connector includes a channel having an open slot through which said reaction canister is received and one or more staked tabs projecting within said channel for positively clamping said reaction canister within said channel.

8. The airbag module of claim 7, wherein:

each of said one or more staked tabs include a free upper edge for lockingly advancing into a surface of said reaction canister as said reaction canister is received in said channel.

9. The airbag module of claim 8, wherein:

said one or more tabs are formed integral with an upper channel side wall.

10. The airbag module of claim 9, wherein:

said one or more tabs comprise two tabs, one tab on each opposite outer edge of said upper channel side wall.

11. The airbag module of claim 10, wherein:

said second end of said spring clip includes a resilient, snap-on connector adapted for snap-fit engagement onto a vehicle mounting bracket fixedly mounted behind a breakaway cover formed in an instrument panel of said motor vehicle.

12. In an airbag module installation in a motor vehicle comprising an airbag module assembly including a reaction canister housing an inflator and a folded airbag behind a breakaway cover formed in an instrument panel of said vehicle, and a spring clip having one end secured to said vehicle and opposite end connectable to said module assembly, the improvement comprising:

a slip-on connector secured to said opposite end of said spring clip; and means for making a self-locking slip-fit connection between said slip-on connector and said module assembly without the use of tools or rivets wherein said self-locking slip-fit connection means comprises a channel formed on said slip-on connector having an open slot through which said airbag module assembly is received and one or more staked tabs projecting within said channel for positively clamping said module assembly within said channel.

13. The improvement of claim 12, wherein:

said one or more tabs contain a free upper edge for advancing into a surface of said module as said module is received in said channel.

14. The improvement of claim 13, wherein:

said one or more tabs are formed integral with a channel side wall.

15. The improvement of claim 14, wherein:

said one or more tabs comprise two tabs, one tab on each opposite outer edge of said channel side wall.

* * * * *